United States Patent
Jeong et al.

(10) Patent No.: US 10,128,666 B2
(45) Date of Patent: Nov. 13, 2018

(54) BATTERY MODULE

(71) Applicant: Samsung SDI Co., Ltd., Yongin-si, Gyeonggi-do (KR)

(72) Inventors: Hyeoncheol Jeong, Yongin-si (KR); Woojoon Chung, Yongin-si (KR); Sejin Ji, Yongin-si (KR); Jongho Park, Yongin-si (KR); Woonseong Baek, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 97 days.

(21) Appl. No.: 15/140,290

(22) Filed: Apr. 27, 2016

(65) Prior Publication Data

US 2016/0322615 A1   Nov. 3, 2016

(30) Foreign Application Priority Data

Apr. 28, 2015 (KR) .......................... 10-2015-0060082

(51) Int. Cl.
*H02J 7/00* (2006.01)
*H01M 2/20* (2006.01)
*H01M 10/42* (2006.01)

(52) U.S. Cl.
CPC ........... *H02J 7/0014* (2013.01); *H01M 2/206* (2013.01); *H01M 10/4207* (2013.01); *H01M 10/425* (2013.01); *H01M 2010/4271* (2013.01); *Y02T 10/7055* (2013.01)

(58) Field of Classification Search
CPC ............. H02J 7/0014; H01M 10/4207; H01M 10/425; H01M 2/206; H01M 2010/4271

USPC ................................................... 320/112, 117
See application file for complete search history.

(56) References Cited

U.S. PATENT DOCUMENTS

| | | | | |
|---|---|---|---|---|
| 5,923,148 | A * | 7/1999 | Sideris | G01R 31/3648 320/116 |
| 6,268,711 | B1 * | 7/2001 | Bearfield | H02J 7/0024 320/116 |
| 8,183,870 | B1 * | 5/2012 | Davies | H01M 10/4207 320/118 |
| 8,704,405 | B2 * | 4/2014 | Deng | H01M 10/441 307/71 |
| 8,795,875 | B2 * | 8/2014 | Lee | H01M 10/425 429/149 |
| 9,293,755 | B2 * | 3/2016 | Bocek | H01M 2/204 |
| 9,450,274 | B2 * | 9/2016 | Vo | H01M 10/4257 |
| 9,647,257 | B2 * | 5/2017 | Ro | H01M 2/34 |
| 9,698,452 | B2 * | 7/2017 | Cho | H01M 10/482 |
| 9,748,777 | B2 * | 8/2017 | Owen | H02J 7/0021 |
| 2005/0275372 | A1 * | 12/2005 | Crowell | H02J 7/0018 320/112 |

(Continued)

FOREIGN PATENT DOCUMENTS

| JP | 2010-205509 A | 9/2010 |
|---|---|---|
| KR | 2011-0128050 A | 11/2011 |
| KR | 2012-0088271 A | 8/2012 |

*Primary Examiner* — M'Baye Diao
(74) *Attorney, Agent, or Firm* — Knobbe Martens Olson & Bear LLP

(57) ABSTRACT

A battery module including: a plurality of battery packs each having a plurality of battery banks; a first wire that connects the plurality of battery packs in parallel; and a second wire that connects battery banks of the different battery packs in parallel. A natural balancing operation may be implemented without a complicated circuit configuration.

16 Claims, 6 Drawing Sheets

(56) References Cited

U.S. PATENT DOCUMENTS

| | | | |
|---|---|---|---|
| 2011/0212348 A1* | 9/2011 | Yasui | H01M 2/1077 |
| | | | 429/7 |
| 2011/0248676 A1* | 10/2011 | Kim | H01M 2/20 |
| | | | 320/118 |
| 2011/0287298 A1 | 11/2011 | Park et al. | |
| 2012/0116699 A1* | 5/2012 | Haag | B60L 3/0046 |
| | | | 702/63 |
| 2012/0194004 A1 | 8/2012 | Lim | |
| 2012/0293128 A1* | 11/2012 | Kim | H02J 7/0016 |
| | | | 320/117 |
| 2013/0260191 A1* | 10/2013 | Takahashi | H01M 2/34 |
| | | | 429/61 |
| 2013/0320772 A1* | 12/2013 | Qiao | H01M 10/04 |
| | | | 307/87 |
| 2014/0132217 A1* | 5/2014 | Kim | H02J 7/00 |
| | | | 320/118 |

* cited by examiner

BATTERY MODULE

RELATED APPLICATIONS

This application claims the benefit of Korean Patent Application No. 10-2015-0060082, filed on Apr. 28, 2015, in the Korean Intellectual Property Office, the disclosure of which is incorporated herein in its entirety by reference.

BACKGROUND

Field

One or more exemplary embodiments relate to battery modules.

Description of the Related Art

In general, secondary batteries are rechargeable, unlike primary batteries. They are used as energy sources for mobile devices, electric vehicles, hybrid vehicles, and electric bicycles, or as uninterruptible power supplies. According to the types of devices that operate based on such batteries, the secondary batteries may be used in the form of one battery or a pack including a plurality of batteries electrically connected to one another and bound to form one unit.

Small mobile devices, such as mobile phones, can operate according to the output and capacity of one battery for a predetermined amount of time. However, when long-time and high-power driving are necessary for electric vehicles with much power consumption and hybrid vehicles, a module including a plurality of batteries is preferred due to higher output and capacity. Thus, an output voltage or output current may be increased according to the number of batteries built in a device.

SUMMARY OF CERTAIN INVENTIVE ASPECTS

One or more exemplary embodiments include battery modules in which a natural balancing operation may be implemented without configuring a complicated circuit.

Additional aspects will be set forth in part in the description which follows and, in part, will be apparent from the description, or may be learned by practice of the presented embodiments.

According to one or more exemplary embodiments, a battery module includes: a plurality of battery packs each having a plurality of battery banks; a first wire that connects the plurality of battery packs in parallel; and a second wire that connects battery banks of the different battery packs in parallel.

The second wire may include: lead wires connected to the battery banks in each battery pack; and connection wires connected between the lead wires of the different battery packs.

Each of the lead wires and the connection wires may include ends on which connectors are formed, and connectors of each lead wire and each connection wire may be formed in the second wire to be directly connectable to each other.

The second wire may directly connect battery banks of the different battery packs.

The second wire may circulate the plurality of battery packs clockwise or counterclockwise and may extend in a closed-loop shape.

The battery module may further include a master board that is connected to the first and second wires and controls charging/discharging operations of the battery packs.

The first wire may form a path of a charging/discharging current of each of the battery packs, and the second wire may form a path of balancing currents between the different battery banks.

A thickness of the first wire may be larger than that of the second wire.

The battery bank may include a plurality of battery cells connected in parallel, and a balancing operation between battery cells of the different battery packs may be implemented through the second wire.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
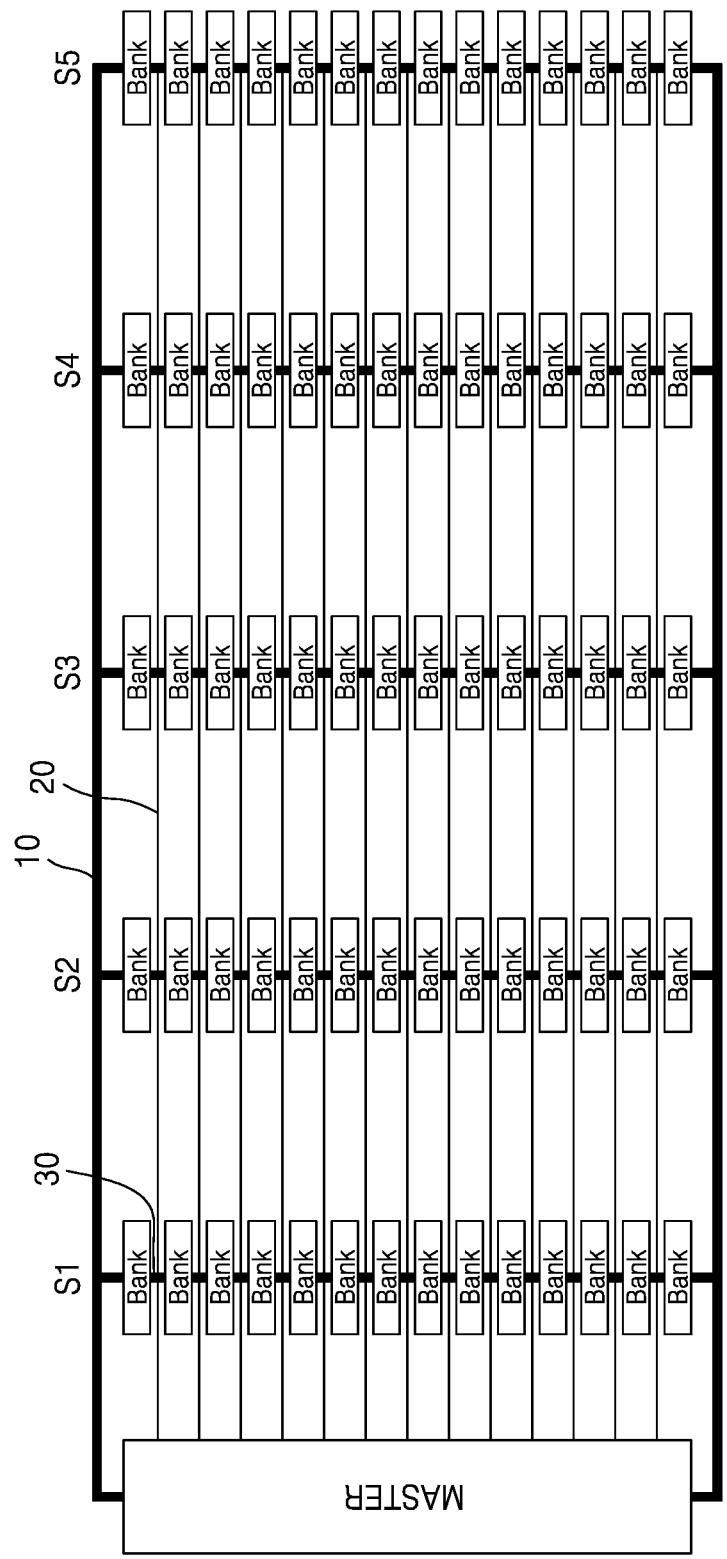
FIG. 1 is a view of a hierarchical structure of a battery module according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, a battery module according to an exemplary embodiment will be described with reference to the attached drawings.

FIG. 1 is a view of a hierarchical structure of a battery module according to an exemplary embodiment.

Referring to FIG. 1, the battery module according to the current embodiment may include a plurality of battery packs S1, S2, S3, S4, and S5 and a master board that is connected to the plurality of battery packs S1, S2, S3, S4, and S5 so as to control charging/discharging operations of the battery packs S1, S2, S3, S4, and S5.

The plurality of battery packs S1, S2, S3, S4, and S5 may be electrically connected to one another and may be connected in parallel to one another. For example, although, in FIG. 1, five battery packs S1, S2, S3, S4, and S5 are connected in parallel to one another, a technical scope of the invention is not limited thereto. For example, the battery packs S1, S2, S3, S4, and S5 may be expanded to a plurality of battery packs to correspond to required electrical outputs.

Each of the battery packs S1, S2, S3, S4, and S5 may include a plurality of battery banks. For example, each of the battery packs S1, S2, S3, S4, and S5 may include a plurality of battery banks electrically connected to one another. For example, each of the battery packs S1, S2, S3, S4, and S5 may include a plurality of battery banks connected in series to one another. A battery bank is a unit for performing a charging/discharging operation and may be widely used in a wide meaning in the invention. For example, the battery bank may include a plurality of battery cells (not shown) individually formed, or the battery bank itself may correspond to a battery cell (not shown). For example, the battery bank may be formed by collecting a plurality of battery cells (not shown) individually formed in an electrically-connected shape, or each battery bank may correspond to a battery cell (not shown). In this way, the battery bank that is a unit for performing a charging/discharging operation may correspond to an assembly of a plurality of battery cells (not shown) or an individual battery cell (not shown).

As illustrated in FIG. 1, the battery packs S1, S2, S3, S4, and S5 may be connected in parallel to one another. For example, the battery packs S1, S2, S3, S4, and S5 may be electrically connected to the adjacent battery packs S1, S2, S3, S4, and S5 through a first wire 10. The battery packs S1, S2, S3, S4, and S5 are electrically connected to the adjacent battery packs S1, S2, S3, S4, and S5, and battery banks are electrically connected to adjacent battery banks.

In more detail, the battery packs S1, S2, S3, S4, and S5 are electrically connected to the adjacent battery packs S1, S2, S3, S4, and S5 through the first wire 10. In this way, battery banks of the battery packs S1, S2, S3, S4, and S5 are electrically connected to battery banks of the adjacent battery packs S1, S2, S3, S4, and S5. That is, a battery bank of one of the battery packs S1, S2, S3, S4, and S5 is electrically connected to a battery bank of another adjacent one of the battery packs S1, S2, S3, S4, and S5, and battery banks of the adjacent battery packs S1, S2, S3, S4, and S5 may be electrically connected to one another through a second wire 20. Here, the second wire 20 electrically connects battery banks of the different battery packs S1, S2, S3, S4, and S5 is different from a third wire 30 that connects battery banks of same battery packs S1, S2, S3, S4, and S5.

For example, each of the battery packs S1, S2, S3, S4, and S5 may include 14 battery banks connected in series to one another, and 14 battery banks of each of the battery packs S1, S2, S3, S4, and S5 may be connected in parallel to 14 battery banks of another adjacent one of the battery packs S1, S2, S3, S4, and S5. 14 serially-connected battery banks of each of the battery packs S1, S2, S3, S4, and S5 have different electrical potentials and the battery banks are electrically connected in respectively the same potentials in the different battery packs S1, S2, S3, S4, and S5.

In an exemplary embodiment, battery banks of the different battery packs S1, S2, S3, S4, and S5 may be directly electrically connected to one another so that balancing between the battery banks may be naturally or automatically performed. Performing natural balancing between the battery banks means that an artificial balancing operation may not be performed but balancing may be automatically implemented through communication of balancing currents caused by a minute electric potential difference through the second wire 20.

Directly connecting battery banks of the different battery packs S1, S2, S3, S4, and S5 refers to directly connecting battery banks of the different battery packs S1, S2, S3, S4, and S5 through one wire, i.e., the second wire 20. In other words, battery banks of the adjacent battery packs S1, S2, S3, S4, and S5, i.e., battery banks in electrically the same positions of the adjacent battery packs S1, S2, S3, S4, and S5 may be directly connected to one another through the second wire 20 without a circuit board or a circuit element.

When the battery banks of the different battery packs S1, S2, S3, S4, and S5 are directly connected to one another, an electric potential difference therebetween may be naturally eliminated or reduced, and even though an intentional balancing operation is not performed, battery banks of the different battery packs S1, S2, S3, S4, and S5 may be maintained to have substantially equal electric potentials (voltages).

For example, in order to implement the balancing operation, i.e., in order to perform an intentional balancing operation of reducing electric potentials (potential differences) by connecting discharging circuits to battery banks having relatively high electric potentials or increasing electric potentials by connecting charging circuits to battery banks having relatively low electric potentials, a plurality of switching elements and a circuit element, such as a discharging resistor, are important, and a control circuit for controlling the balancing operation is also important. For example, under control of the control circuit, measurement of voltages of each battery bank, determination of starting conditions for starting the balancing operation, and controlling of each of the plurality of switching elements operated when starting the balancing operation are periodically implemented.

In an exemplary embodiment, battery banks of the different battery packs S1, S2, S3, S4, and S5 are directly connected to one another so that a natural balancing operation may be implemented and a complicated circuit does not need to be configured. Nevertheless, charging/discharging efficiency may be improved by balancing. For example, when a voltage difference between different battery banks is reduced by the balancing operation, charging may be performed up to higher voltages, and discharging may be performed down to lower voltages.

Figure 2:
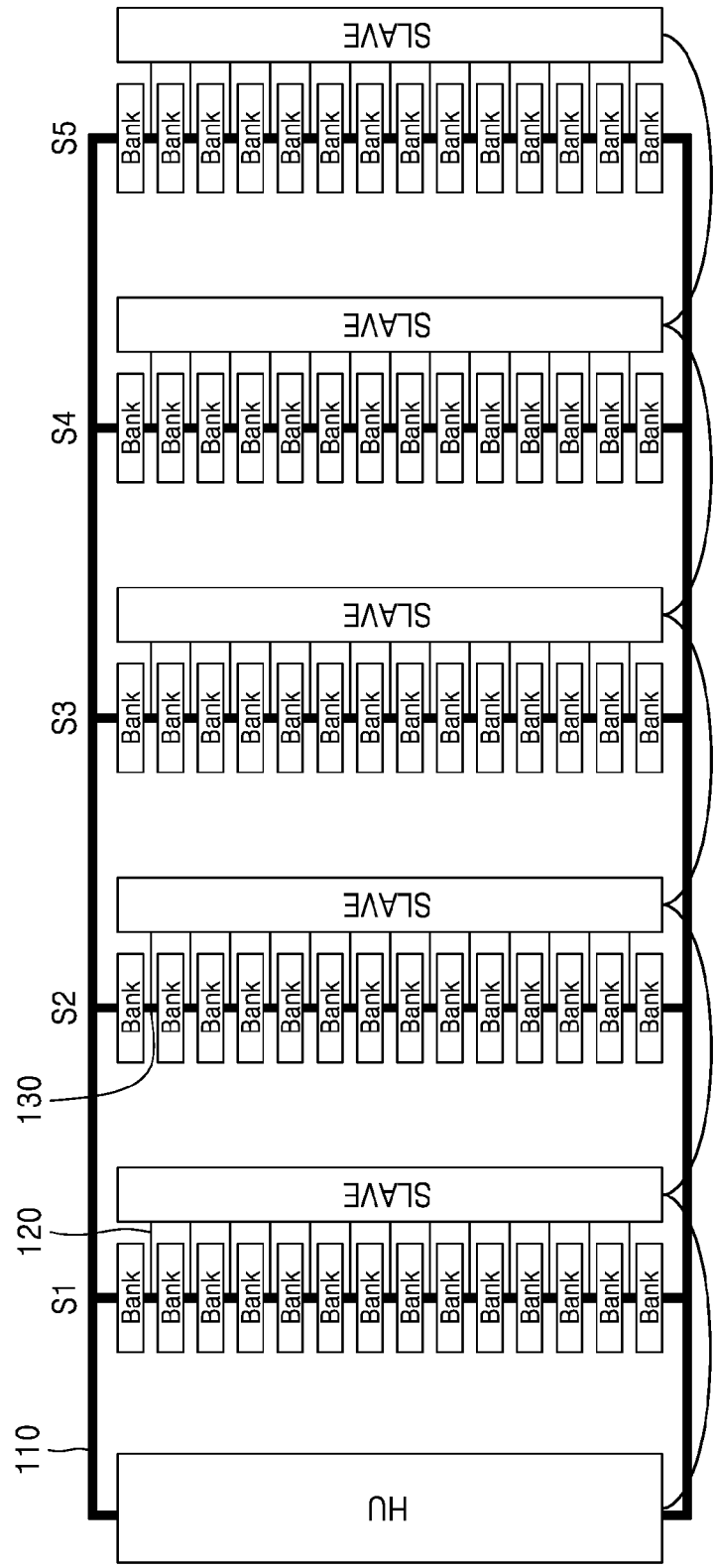
FIG. 2 is a view of a hierarchical structure of a battery module according to a comparative example compared to the exemplary embodiment.

FIG. 2 is a view of a hierarchical structure of a battery module according to a comparative example compared to the exemplary embodiment. Referring to FIG. 1, the battery module may include a plurality of battery packs S1, S2, S3, S4, and S5 electrically connected to one another. In FIG. 2, the plurality of battery packs S1, S2, S3, S4, and S5 may be connected in parallel to one another through a first wire 110.

Each of the battery packs S1, S2, S3, S4, and S5 includes a plurality of battery banks and a slave board that is connected to the battery banks to perform a balancing operation of the battery banks. The slave board may be connected to each battery bank through the second wire 120 to measure a voltage of each battery bank and to perform a balancing operation according to the result of measurement. The slave board of each of the battery packs S1, S2, S3, S4, and S5 is electrically connected to the master board and performs the balancing operation under control of the master board.

In the exemplary embodiment illustrated in FIG. 1, battery banks of the different battery packs S1, S2, S3, S4, and S5 are directly electrically connected to one another so that the balancing operation between different battery banks may be naturally performed and no slave board is required to implement an intentional balancing operation. That is, in the exemplary embodiment, no slave board built in each of the battery packs S1, S2, S3, S4, and S5 is required so that production cost for implementing the slave board may be reduced and a compact configuration of the battery packs S1, S2, S3, S4, and S5 may be established by deleting the slave board. Reference numeral 130 that is not explained in FIG. 2 refers to a third wire that connects battery banks in the same battery packs S1, S2, S3, S4, and S5.

Referring to FIG. 1, the first wire 10 forms a path for large currents along which charging/discharging currents of the battery packs S1, S2, S3, S4, and S5 flow. The second wire 20 forms a path of small currents caused by electric potential unbalance between adjacent battery banks. The thickness of the first wire 10 may be larger than the thickness of the second wire 20. This configuration is established to improve output caused by reduction in resistance by forming the thickness of the first wire 10 through which relatively large currents flow. Relatively small currents flow through the second wire 20 so that the second wire 20 may be formed to have a smaller thickness than that of the first wire 10 in consideration of production cost of the second wire 20.

Referring to FIG. 1, the second wire 20 electrically connects adjacent battery banks. An end of the second wire 20 may be connected to the master board to measure voltage signals of the battery banks. For example, the master board may be connected to the first and second wires 10 and 20, and may be formed on a charging/discharging path through the first wire 10 to optionally open/close a path of a charging/discharging current and to acquire status information, such as voltages or temperatures of the battery banks through the second wire 20. The master board may control the charging/discharging operation based on the acquired status information.

For example, charging/discharging currents of the battery packs S1, S2, S3, S4, and S5 may flow through the outside through the master board, and for example, charging currents may flow through the battery packs S1, S2, S3, S4, and S5 from an external charging device through the master board, and discharging currents may flow through an external load through the master board. The master board may be electrically connected to the battery packs S1, S2, S3, S4, and S5 and may control the charging/discharging operations of the battery packs S1, S2, S3, S4, and S5.

Figure 3:
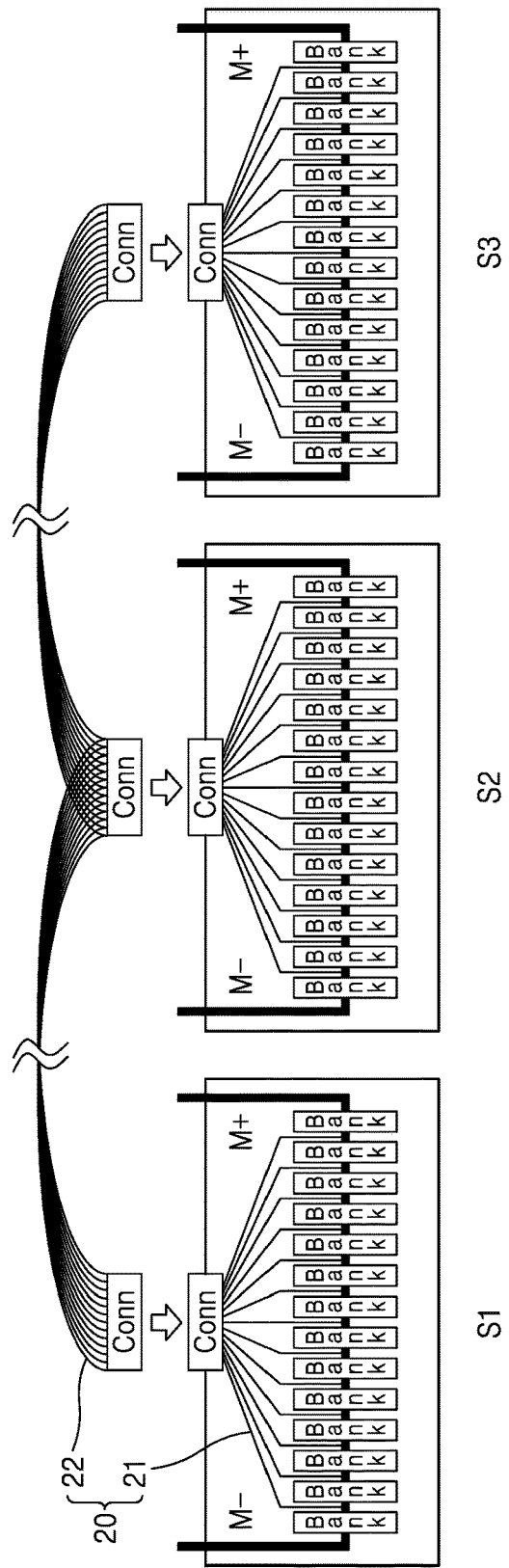
FIG. 3 is a view of a connection state of the battery module illustrated in FIG. 1.

FIG. 3 is a view of a view of a connection state of the battery module illustrated in FIG. 1. Referring to FIG. 3, the second wire 20 electrically connects adjacent battery banks. In this case, the second wire 20 may include lead wires 21 that extend from the battery banks and connection wires 22 interposed between the lead wires 21 of adjacent battery packs S1, S2, S3, S4, and S5. For example, the lead wires 21 may be formed in each of the battery packs S1, S2, S3, S4, and S5. The lead wires 21 may form electrical contact points with each battery bank within the battery packs S1, S2, S3, S4, and S5 and may form one-to-one contact points with each battery bank. The connection wires 22 connect the adjacent lead wires 21.

For example, each of the lead wires 21 may extend from one end connected to each battery bank and may include the other end on which a connector Conn is formed. The connection wires 22 may be connected to the connector Conn of each lead wire 21. For example, the connector Conn may be formed on one end of each of the connection wires 22 inserted into the connector Conn of the lead wire 21. The lead wires 21 and the connection wires 22 may be electrically connected to one another through the ends on which the connectors Conn are formed. That is, connectors Conn of the lead wires 21 and connectors Conn of the connection wires 22 may be formed in the second wire 20 to be directly connectable to each other.

One end of each connection wire 22 may be connected to each lead wire 21 of one of the battery packs S1, S2, S3, S4, and S5, and the other end of each connection wire 22 may be connected to each lead wire 21 of another adjacent one of the battery packs S1, S2, S3, S4, and S5. In this way, the connection wires 22 may be interposed between the lead wires 21 of the adjacent battery packs S1, S2, S3, S4, and S5.

To sum up, the second wire 20 for connecting the battery banks is disposed between a pair of adjacent battery packs S1, S2, S3, S4, and S5, and the second wire 20 includes the lead wires 21 that extend from each of the battery packs S1, S2, S3, S4, and S5 that form a pair and connection wires 22 interposed between the lead wires 21. Here, the lead wires 21 and the connection wires 22 may be connected through their ends on which the connectors Conn are disposed.

The connection wires 22 may be disposed in the form of a plurality of strands in which a plurality of connectors Conn are disposed to be spaced apart from each other. For example, a part of the connection wires inserted into one of the battery packs S1, S2, S3, S4, and S5 may extend to the adjacent battery packs S1, S2, S3, S4, and S5 on the one hand, and the other part of the connection wires 22 may extend to the adjacent battery packs S1, S2, S3, S4, and S5 on the other hand. The connection wires 22 may be inserted into the connectors Conn of each of the battery packs S1, S2, S3, S4, and S5, i.e., the connectors Conn connected to the lead wires 21 of each of the battery packs S1, S2, S3, S4, and S5. Although not shown, terminals M− and M+ of the battery packs S1, S2, S3, S4, and S5 may be electrically connected to another adjacent one of the battery packs S1, S2, S3, S4, and S5 through a first wire 10 (not shown).

When the second wire 20 is provided for balancing between different battery banks, the first wire 10 is provided to form a path of a charging/discharging current. That is, the second wire 20 may form a path of a balancing current between different battery banks, and the first wire 10 may form the path of the charging/discharging current.

The lead wires 21 and the connectors Conn may be disposed in each of the battery packs S1, S2, S3, S4, and S5. For example, the connectors Conn may be formed to be exposed to an outside of each of the battery packs S1, S2, S3, S4, and S5 and may facilitate connection with the connection wires 22. The lead wires 21 each having a plurality of strands may be collected in the connectors Conn that extend from each battery bank and may be connected to the connectors Conn of the connection wires 22. The lead wires 21 and the connection wires 22 may include a plurality of strands, and each of the strands may connect a pair of different battery banks. The lead wires 21 and the connection wires 22 may include the same number of strands.

The connectors Conn of the lead wires 21 and the connectors Conn of the connection wires 22 may be formed to be matched to one another. For example, one connector Conn may include a plurality of pin structures (not shown), and another connector Conn may include a plurality of hole structures (not shown) so that the one connector Conn and the other connector Conn may be matched and inserted into each other.

The connectors Conn of the connection wires 22 may be inserted into the connectors Conn of one of the battery packs S1, S2, S3, S4, and S5, and a part of the connection wires 22 may extend to adjacent battery packs S1, S2, S3, S4, and S5 on one side of the battery packs S1, S2, S3, S4, and S5, and another part of the connection wires 22 may extend to adjacent battery packs S1, S2, S3, S4, and S5 on the other side thereof. In this way, the connection wires 22 may extend to the different battery packs S1, S2, S3, S4, and S5 so that, for example, although a part of the connection wires 22 is disconnected, the balancing operation may be implemented. For example, although the connection wires 22 connected to one of the battery packs S1, S2, S3, S4, and S5 are disconnected, balancing of the corresponding battery packs S1, S2, S3, S4, and S5 may be implemented through the connection wires 22 connected to the other battery packs S1, S2, S3, S4, and S5.

Figure 4:
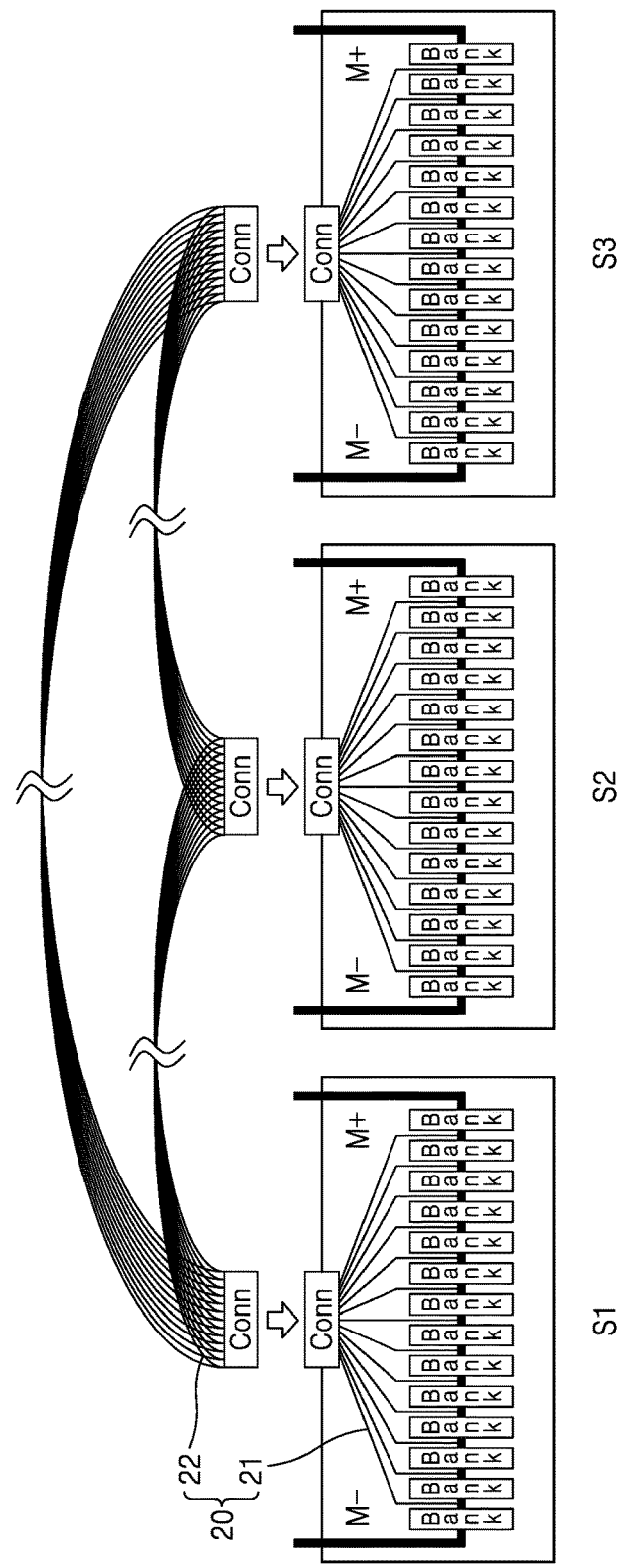
FIG. 4 is a view of a connection state of a battery module according to another exemplary embodiment.

FIG. 4 is a view of a connection state of a battery module according to another exemplary embodiment. Referring to FIG. 4, the connection wires 22 may extend by circulating the plurality of battery packs S1, S2, S3, S4, and S5 clockwise or counterclockwise. For example, the connection wires 22 may extend by circulating the plurality of battery packs S1, S2, S3, S4, and S5 clockwise or counterclockwise. The connection wires 22 may extend in an origin return manner to be concluded at the battery packs S1, S2, S3, S4, and S5 so as to have the same starting point and ending point.

In this way, when the plurality of battery packs S1, S2, S3, S4, and S5 are connected in a circulation manner, although a part of the connection wires 22 is disconnected, the balancing operation may be performed through the other part of the connection wires 22 that extend in a closed-loop shape. For example, although the connection wires 22 connected to one of the battery packs S1, S2, S3, S4, and S5 are disconnected, the balancing operation of the battery packs S1, S2, S3, S4, and S5 may be performed through the connection wires 22 connected to another one of the battery packs S1, S2, S3, S4, and S5. That is, since both sides of each of the battery packs S1, S2, S3, S4, and S5 are connected to the different battery packs S1, S2, S3, S4, and S5, although connection with one of the battery packs S1, S2, S3, S4, and S5 is disconnected, balancing may be performed through connection with another one of the battery packs S1, S2, S3, S4, and S5.

Figure 5:
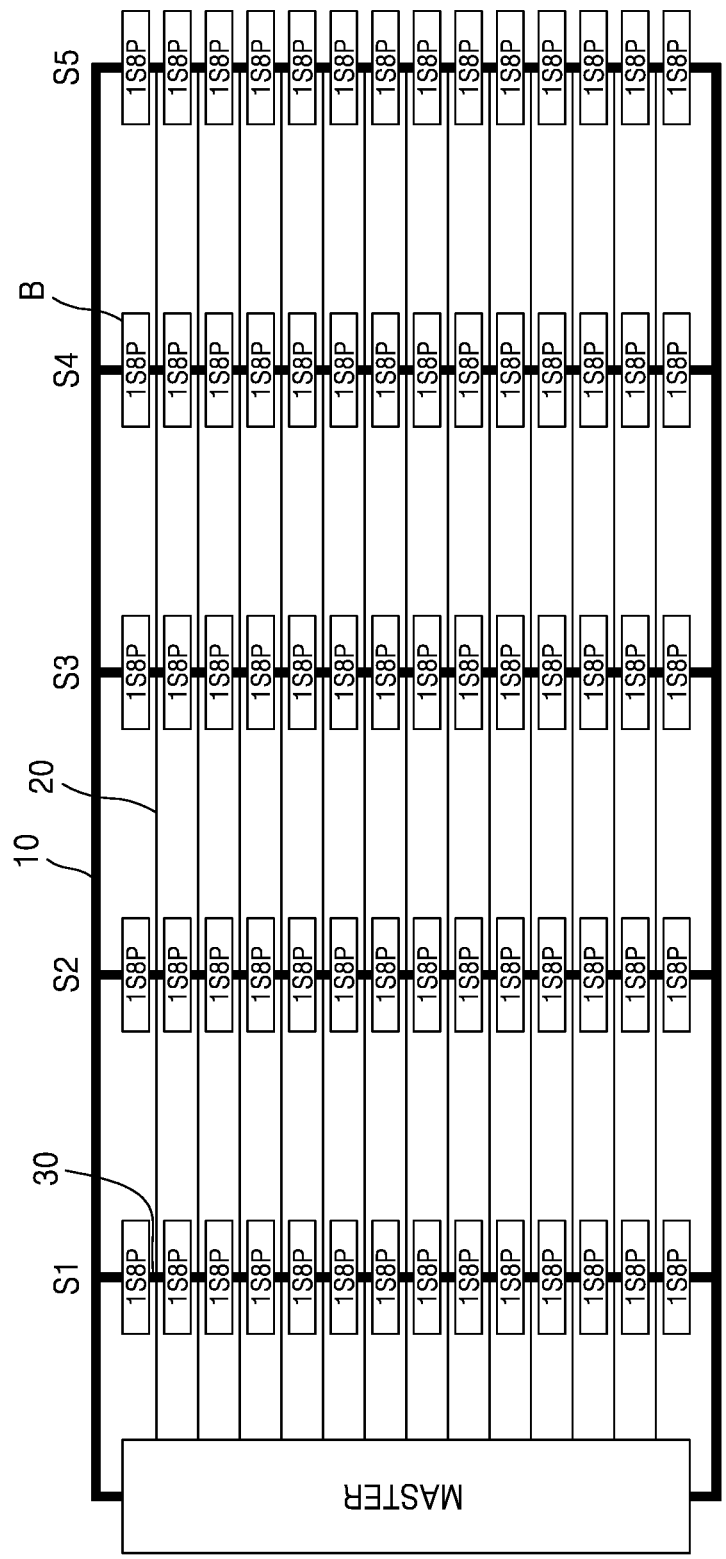
FIG. 5 is a view of a hierarchical structure of the battery module illustrated in FIG. 4.
Figure 6:
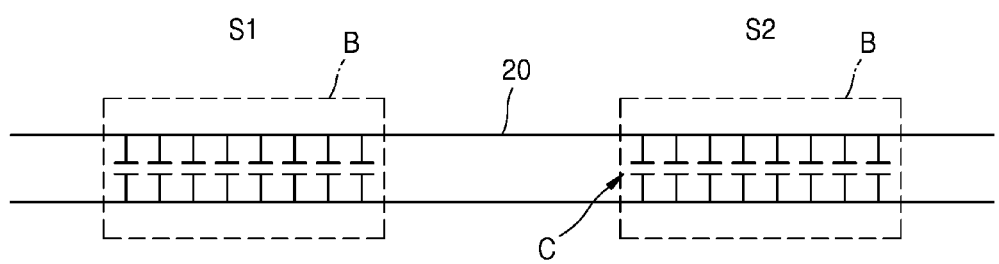
FIG. 6 is a view of an internal structure of a battery bank illustrated in FIG. 5.

FIG. 5 is a view of a hierarchical structure of the battery module illustrated in FIG. 4. FIG. 6 is a view of an internal structure of a battery bank illustrated in FIG. 5.

Referring to FIGS. 5 and 6, the battery module may include a plurality of battery packs S1, S2, S3, S4, and S5. The plurality of battery packs S1, S2, S3, S4, and S5 may be connected in parallel to one another through the first wire 10, and battery banks B of the different battery packs S1, S2, S3, S4, and S5 may be connected in parallel to one another through the second wire 20. Here, each of the battery banks B may include a plurality of battery cells C connected in parallel. For example, the battery packs S1, S2, S3, S4, and S5 may include 14 battery banks B, and 14 battery banks of one of the battery packs S1, S2, S3, S4, and S5 may be connected in parallel to 14 battery banks B of the adjacent battery packs S1, S2, S3, S4, and S5. In this case, each battery bank B may include 8 battery cells C. In this case, the battery banks B are directly connected to one another through the second wire 20 so that balancing of the different battery banks B may be implemented. The second wire 20 connects the battery banks B in parallel and simultaneously connects the battery cells C of the battery banks B in parallel. That is, the second wire 20 connects the battery banks B of the different battery packs S1, S2, S3, S4, and S5 in parallel and simultaneously connects the battery cells C of the different battery packs S1, S2, S3, S4, and S5 in parallel. For example, one of the battery cells C is connected to another adjacent one of the battery cells C, i.e., the battery cell C that belongs to the different battery packs S1, S2, S3, S4, and S5 from the corresponding one of the battery packs S1, S2, S3, S4, and S5 through the second wire 20. Thus, automatic balancing may be performed between the battery cells C that belong to the different battery packs S1, S2, S3, S4, and S5 through the second wire 20.

In an exemplary embodiment, battery banks of different battery packs are directly electrically connected to one another so that balancing between the battery banks may be naturally or automatically performed. For example, balancing may be more automatically performed through communication of balancing currents caused by a minute electric potential difference.

For example, in order to implement the balancing operation, i.e., in order to perform an intentional balancing operation of reducing electric potentials by connecting discharging circuits to battery banks having relatively high electric potentials or increasing electric potentials by connecting charging circuits to battery banks having relatively low electric potentials, a plurality of switching elements and a circuit element, such as a discharging resistor, are necessary, and a control circuit for controlling the balancing operation is also necessary. For example, under control of the control circuit, voltage measurements of each battery bank, determination of starting conditions for starting the balancing operation, and controlling each of the plurality of switching elements caused by starting the balancing operation are periodically needed.

In an exemplary embodiment, battery banks of the different battery packs S1, S2, S3, S4, and S5 are directly connected to one another so that a natural balancing operation may be implemented and a complicated circuit does not need to be configured. Nevertheless, charging/discharging efficiency may be improved by balancing. For example, when a voltage difference between different battery banks is reduced by the balancing operation, charging may be performed up to high voltages, and discharging may be performed up to low voltages.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A battery module comprising:
 a plurality of battery packs each having a plurality of battery banks;
 a first wire that connects the plurality of battery packs in parallel; and
 a second wire that connects battery banks of the different battery packs in parallel wherein the first wire forms a path of a charging/discharging current of each of the battery packs, and the second wire forms a path of balancing currents between the different battery banks.

2. The battery module of claim 1, wherein the second wire comprises:
 lead wires connected to the battery banks in each battery pack; and
 connection wires connected between the lead wires of the different battery packs.

3. The battery module of claim 2, wherein each of the lead wires and the connection wires comprises ends on which connectors are formed, and
 connectors of each lead wire and each connection wire are formed in the second wire to be directly connectable to each other.

4. The battery module of claim 1, wherein the second wire directly connects battery banks of the different battery packs.

5. The battery module of claim 1, wherein the second wire circulates the plurality of battery packs clockwise or counterclockwise and extends in a closed-loop form.

6. The battery module of claim 1, further comprising a master board that is connected to the first and second wires and controls charging/discharging operations of the battery packs.

7. The battery module of claim 1, wherein a thickness of the first wire is larger than that of the second wire.

8. The battery module of claim 1, wherein the battery bank comprises a plurality of battery cells connected in parallel, and a balancing operation between battery cells of the different battery packs is implemented through the second wire.

9. A battery module comprising a plurality of battery packs each having a plurality of battery banks wherein the plurality of battery packs are connected in parallel and wherein the battery banks of the different battery packs are connected in parallel and a balancing wire that forms a path of a charging/discharging current of each of the battery packs, and a battery pack wire that forms a path of balancing currents between the different battery banks.

10. The battery module of claim 9, wherein the battery banks of the different battery packs are connected in parallel by a balancing wire comprises:
lead wires connected to the battery banks in each battery pack; and
connection wires connected between the lead wires of the different battery packs.

11. The battery module of claim 10, wherein each of the lead wires and the connection wires comprises ends on which connectors are formed, and
connectors of each lead wire and each connection wire are formed in the balancing wire to be directly connectable to each other.

12. The battery module of claim 9, wherein the balancing wire directly connects battery banks of the different battery packs.

13. The battery module of claim 9, wherein the balancing wire circulates the plurality of battery packs clockwise or counterclockwise and extends in a closed-loop form.

14. The battery module of claim 9, further comprising a master board that is connected to the battery packs and battery banks and controls charging/discharging operations of the battery packs.

15. The battery module of claim 9, wherein a thickness of the battery pack wire is larger than that of the balancing wire.

16. The battery module of claim 9, wherein the battery bank comprises a plurality of battery cells connected in parallel, and a balancing operation between battery cells of the different battery packs is implemented through the balancing wire.

* * * * *